United States Patent
Bing et al.

(10) Patent No.: US 7,051,463 B2
(45) Date of Patent: May 30, 2006

(54) DOCUMENT DISPLAY AND RETENTION DEVICE

(75) Inventors: Howard M. Bing, Seattle, WA (US); Richard A. Bennett, Edmonds, WA (US)

(73) Assignee: Corbitz, Ltd., Seattle, WA (US)

( * ) Notice: Subject to any disclaimer, the term of this patent is extended or adjusted under 35 U.S.C. 154(b) by 43 days.

(21) Appl. No.: 10/394,537

(22) Filed: Mar. 20, 2003

(65) Prior Publication Data

US 2003/0177682 A1 Sep. 25, 2003

Related U.S. Application Data

(60) Provisional application No. 60/366,697, filed on Mar. 22, 2002.

(51) Int. Cl.
*B41J 11/38* (2006.01)

(52) U.S. Cl. .............................. 40/341; 40/649; 40/661; 40/658; 248/444.1; 248/451; 248/459; 281/45

(58) Field of Classification Search .................. 40/341, 40/649, 661, 658; 248/176.1, 444.1, 450, 248/451, 459; 402/19; 462/71; 281/29, 34, 281/35, 45, 46, 47

See application file for complete search history.

(56) References Cited

U.S. PATENT DOCUMENTS

| | | | |
|---|---|---|---|
| D83,437 S | | 2/1931 | Goldberg |
| D202,940 S | | 11/1965 | Bloom .......................... D59/2 |
| 4,486,032 A | * | 12/1984 | Leahy ........................... 281/46 |
| 4,639,157 A | * | 1/1987 | Herzfeld ....................... 402/19 |
| 5,251,766 A | | 10/1993 | Barry ........................... 211/89 |
| 5,301,915 A | | 4/1994 | Bahniuk et al. ............. 248/452 |
| D366,674 S | | 1/1996 | Hirai ........................... D19/86 |
| 5,819,456 A | * | 10/1998 | Schwartz .................. 40/642.01 |
| 5,865,469 A | * | 2/1999 | Chin ............................ 281/45 |
| 5,975,478 A | * | 11/1999 | Marino ...................... 248/442.2 |
| 5,988,582 A | | 11/1999 | Olivo ........................ 248/442.2 |
| 6,209,246 B1 | * | 4/2001 | Schwartz .................. 40/642.01 |
| 6,273,374 B1 | * | 8/2001 | Mc Duffey ............... 248/205.3 |
| 6,286,800 B1 | * | 9/2001 | Junius et al. ............. 248/442.2 |
| D451,964 S | | 12/2001 | Chan ........................... D19/90 |
| 6,371,520 B1 | * | 4/2002 | Wolff et al. ................... 281/29 |
| 6,430,856 B1 | * | 8/2002 | Schwartz .................. 40/642.01 |
| 6,632,316 B1 | * | 10/2003 | Garvic ........................ 156/247 |
| 6,663,311 B1 | * | 12/2003 | Ong ............................. 402/19 |
| 6,678,977 B1 | * | 1/2004 | Sherman ...................... 40/341 |

FOREIGN PATENT DOCUMENTS

DE    201 04 880 U 1    8/2001

OTHER PUBLICATIONS

Fellowes Monitor Mount Copyholder, URL=http://www.officequarters.com/product.php/prod_id/2042324.html, download date May 30, 2003.
Note Holder, URL=http://shop.store.yahoo.com/allmyhome/16871.html, download date May 30, 2003.
Business Card Holder, URL=http://www.objectsofenvy.com/n725–14.html, download date May 30, 2003.
Yellow Brick Note Holders, URL=http://shop.store.yahoo.com/toto–lyoz/yelbricnotho.html, download date May 30, 2003.

* cited by examiner

*Primary Examiner*—Gary C. Hoge
(74) *Attorney, Agent, or Firm*—Seed Intellectual Propery Law Group PLLC

(57) ABSTRACT

A device for displaying and exchanging a plurality of documents of various shapes and sizes and for organizing the same. The device of the present invention comprises at least two layers of pliable sheet material. If multiple sheets are used, the sheets may be nested together. The sheets may then be inserted into a binder mechanism where the binder mechanism compressibly engages the layers to create a pressure region adjacent thereto. The frictional force between the sheet material and the inserted document retains a document inserted into the pressure region formed between two adjacent layers.

5 Claims, 9 Drawing Sheets

DOCUMENT DISPLAY AND RETENTION DEVICE

BACKGROUND OF THE INVENTION

1. Field of the Invention

The present invention relates to devices, systems and methods for retaining and displaying documents, photographs and the like.

2. Background

People often need to view messages, refer to notes, lists, or schedules, display pictures of loved ones, or view multiple documents simultaneously. Consequently, it is not surprising that a variety of ways exist in the prior art for displaying documents, written messages, and even small photos; for example, self-adhesive "Post-it" notes, easels, clips, and cork boards. However, each of these devices has its drawbacks. Self-adhesive "Post-it" notes do not adhere well to the fingerprint resistant finish of a computer workstation, cannot be re-posted several times, easily drop off the monitor, and may be easily lost or misplaced. Clips are limited in the number of documents that can be simultaneously displayed. Easels take up precious desktop space and are also limited in the number of documents that can be simultaneously displayed.

A paper channel containing tubular inserts, such as the one shown and described in U.S. Pat. No. 6,286,800, issued to Junius et al. and incorporated herein by reference, permits more flexibility than the above examples with respect to the number of documents that can be simultaneously displayed; however, such a paper channel physically captures a portion of the document itself. This contact with the document can tear or bend documents or leave impression marks on the documents. The impressions are undesirable on photos and other important documents. Consequently, there is a need for an improved device or system for simultaneously displaying documents, photos and the like.

BRIEF SUMMARY OF THE INVENTION

The present invention is directed toward devices, systems and methods for displaying and organizing documents of various shapes and sizes. In one embodiment described herein, the device of the present invention incorporates a transparent sheet folded to form two layers having a common edge. The common edge of the sheet or layers is then inserted into a binder mechanism, where the binder mechanism urges the layers together to create a pressure region proximate thereto. The adjacent layers of the transparent sheets retain a document inserted therein by electrostatic and frictional force between the sheet material and the document. In another embodiment, several layers of transparent sheets are used to separately hold several documents. In still other embodiments, a wide variety of binders and mounting mechanisms are envisioned.

The device may be used in a variety of locations and orientations, such as along an edge of a computer monitor or other office furniture, in kitchens, automobiles or almost any other location. The layers may be tabbed and/or colored to provide for more efficient organization and access to documents. Additionally, the binder mechanisms used to bind the sheet or sheets may be removable to allow a user to easily and quickly reconfigure or clean the sheets.

A significant advantage of the present invention is that the binder mechanism does not hold the documents. Instead, electrostatic forces and a pressure region adjacent to the binder mechanism combine to retain the documents. Therefore, the containment of the documents does not rely on gravity, on an active mechanical clipping mechanism, or on an adhesive. The device permits easy insertion and removal of the documents without damaging the documents in any manner.

DETAILED DESCRIPTION OF THE INVENTION

The present invention is generally directed toward devices, systems and methods for retaining and displaying documents. The documents may be retained between two sheets of the device by electrostatic forces and/or by pressure created by binding the device with a binder mechanism. A pressure region exists adjacent to the binder mechanism such that no manipulation of the binder mechanism is necessary to insert or remove a document. The term "documents" as used herein includes anything flat and thin, such as cards, appointment cards, credit cards, pictures, 3×5 cards, receipts, tickets, postage stamps, instructions, "Post-it" notes, recipes, coupons, sports schedules, lottery tickets, drawings, correspondence, letters, post-cards, flyers, school menus, announcements, lists, and warning documents.

The present invention provides document display options for work, a home office, home, or virtually anywhere else; it can be used vertically, horizontally, angled or even upside down. The device may be attached to the surface of a variety of products such as a computer monitor, computer keyboard, printer, lamppost, cabinet, appliance, telephone, shelf and/or a desk. The present invention also permits the documents to be easily inserted, removed, and/or exchanged with new documents. Further, the device can be easily and quickly reconfigured to place more important documents in constant view without hindering or obscuring the view of other documents. Many specific details of the present invention are set forth in the embodiments described and illustrated herein to provide an understanding of the invention. One skilled in the art, however, will understand that the present invention may have additional and alternative embodiments, or may be practiced without several of the details described in the following description.

Figure 1:
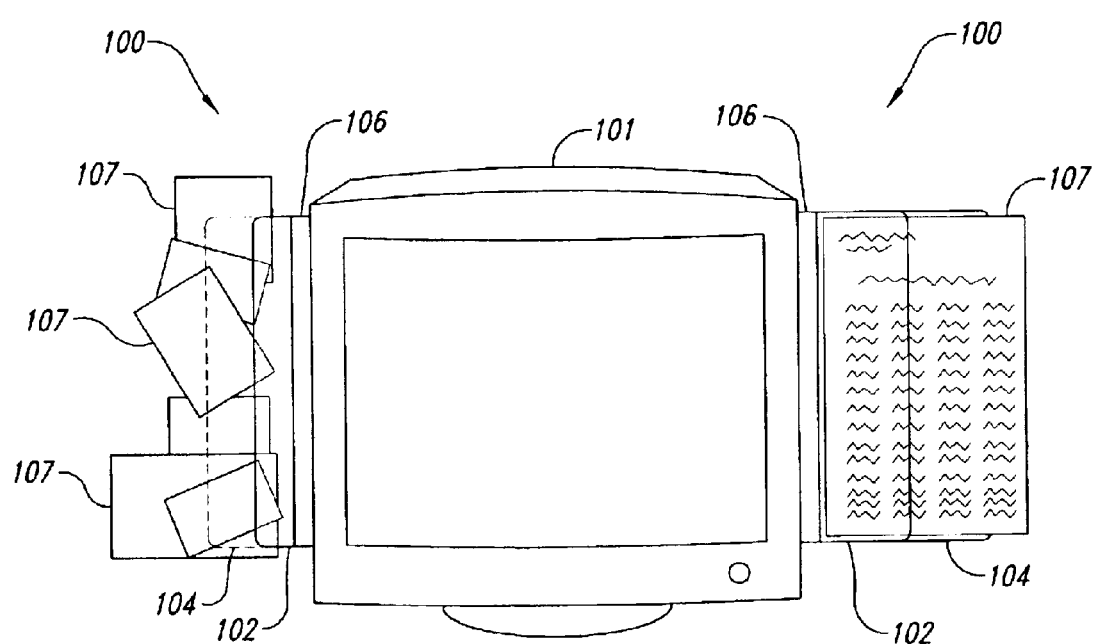
FIG. 1 is an elevation view of a computer monitor having display devices according to an embodiment of the present invention attached thereto
Figures 2, 3:
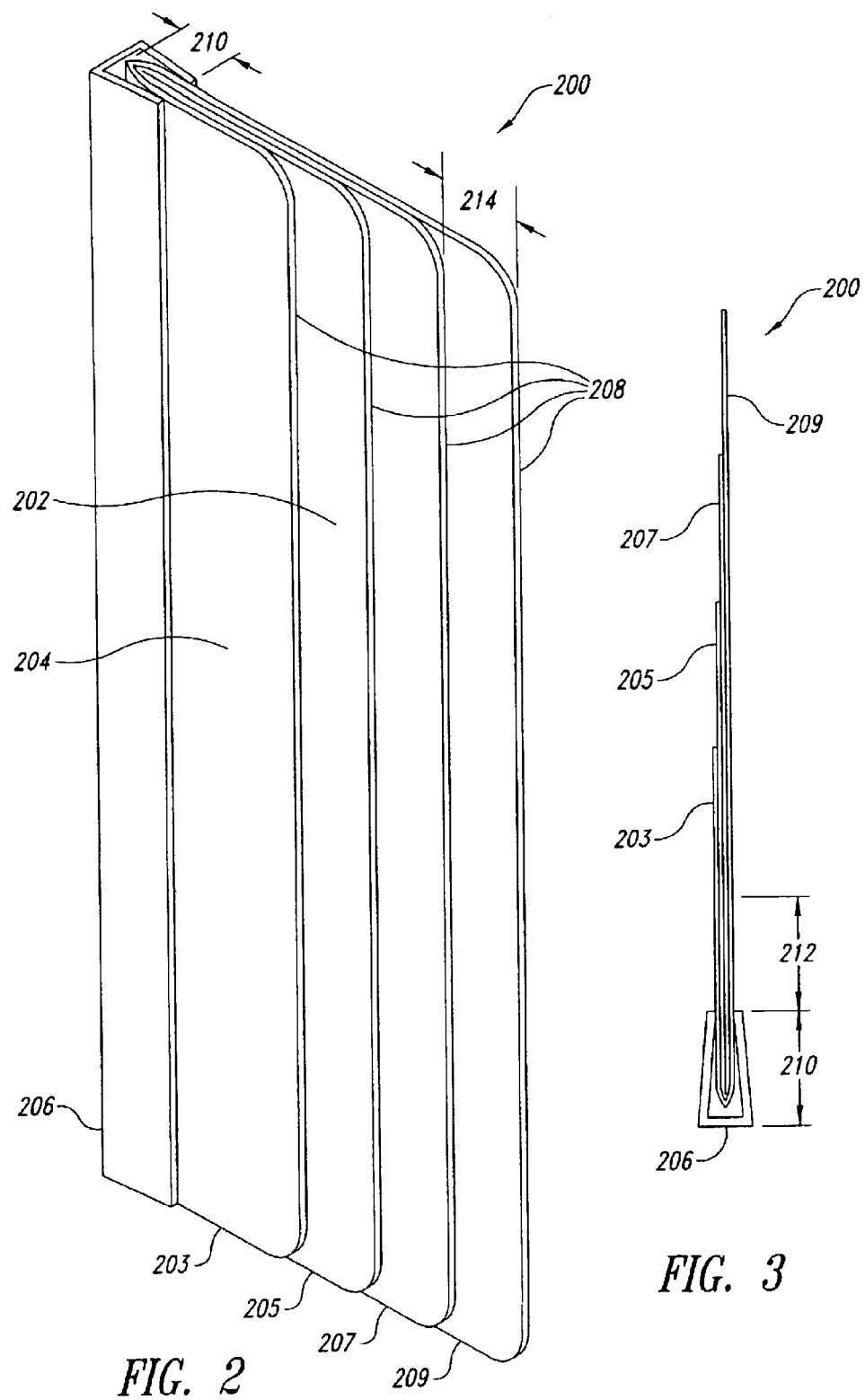
FIG. 2 is an isometric view of a display device according to one embodiment of the present invention.
FIG. 3 is an end view of the device of FIG. 2.
Figure 4:
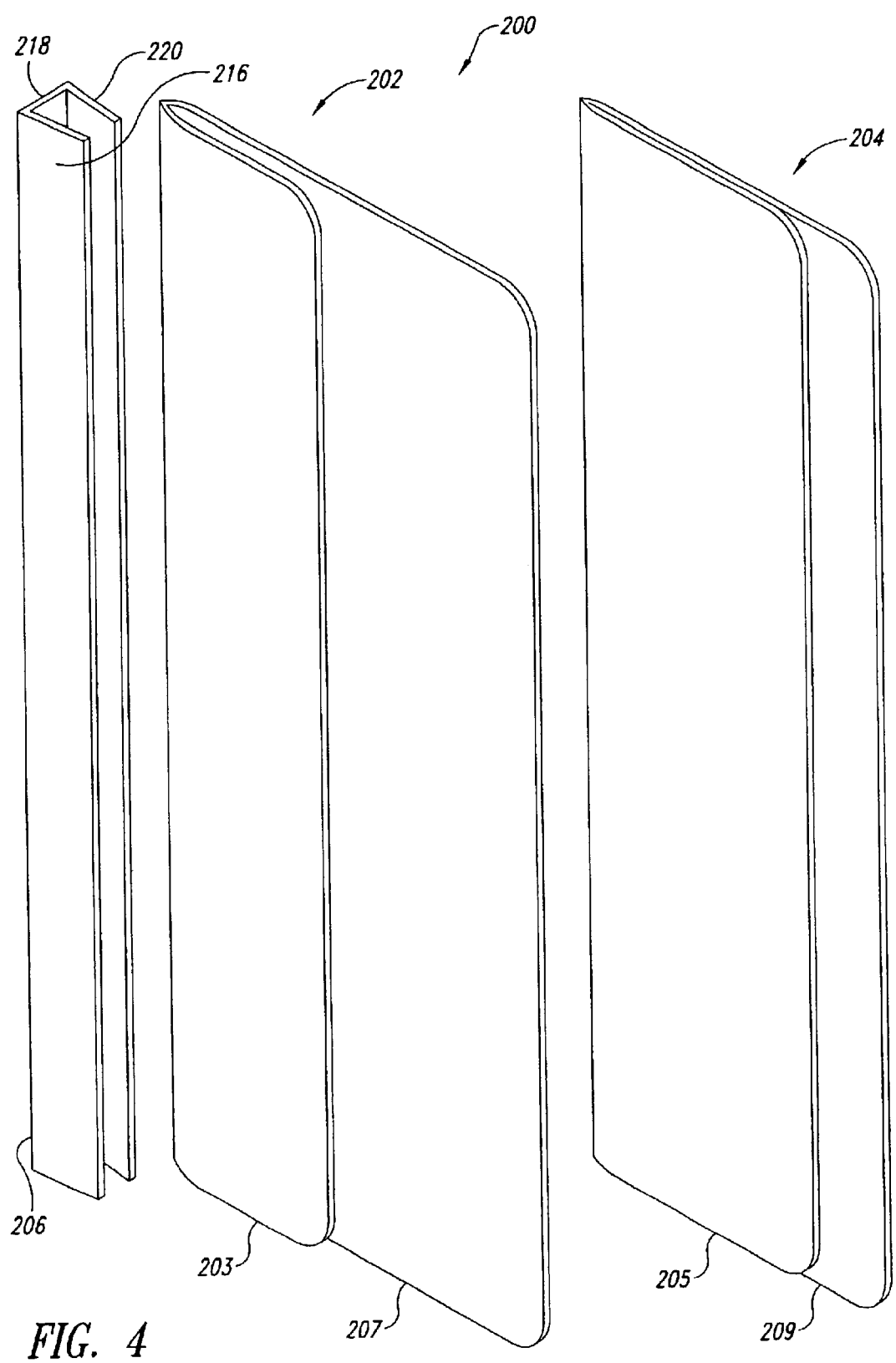
FIG. 4 is an exploded, isometric view of the device of FIG. 2.
Figure 5:
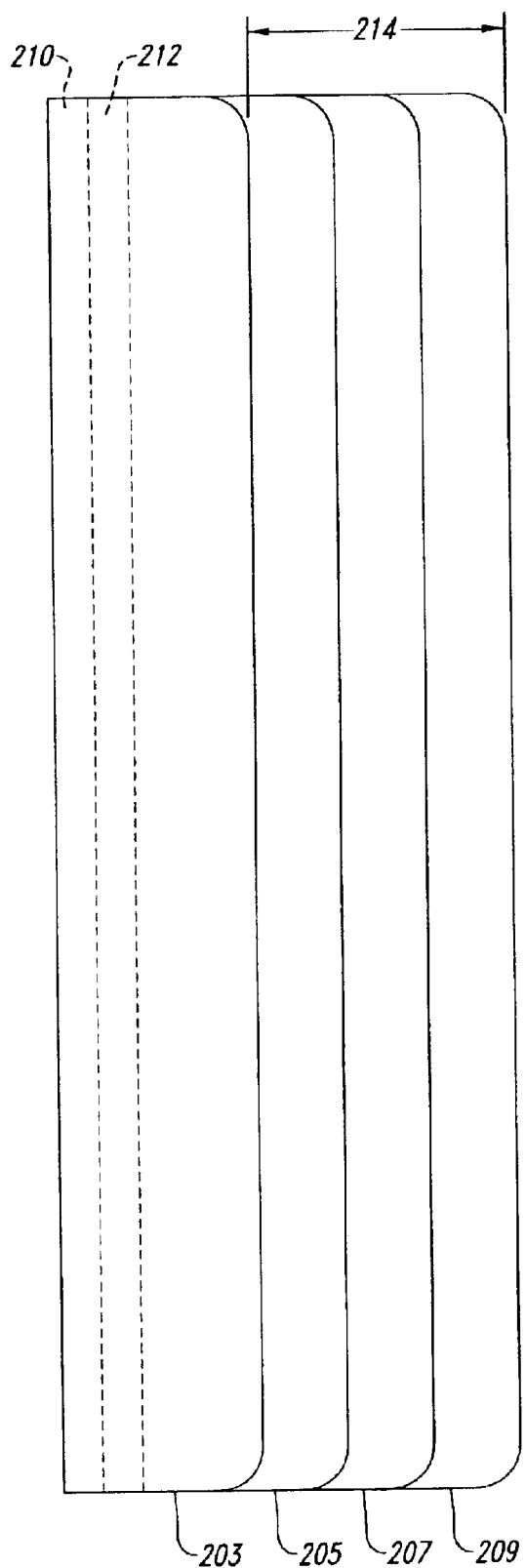
FIG. 5 is a plan view of sheets from the device of FIG. 2, in a first configuration.

FIG. 1 illustrates one embodiment of the invention mounted to the vertical sidewalls of a computer monitor. The illustrated device 100 is primarily composed of at least two sheets 102, 104 of sufficiently rigid and preferably, transparent material attached at a common edge by a binder mechanism 106. The illustrated binder mechanism 106 pinches together the sheets 102, 104, and also acts as an interfacing component to attach the display device 100 to the sidewalls of a monitor 101. The binder mechanism 106 may be attached through a variety of means, such as adhesive, foam tape, magnetic strips, or VELCRO®.

The binding of the sheets 102, 104 creates a region proximate to the binder mechanism 106 wherein documents 107 can be retained solely between the sheet layers themselves by electrostatic and frictional forces. The frictional forces are created in a region proximate to the binder mechanism 106 due at least in part to the pressure exerted by the binder mechanism 106 in conjunction with the rigidity of the sheet material. The binder mechanism 106 may be integrally formed from a variety of materials such as plastic, wood, plastic reinforced composite material, ceramic, or glass with extending flanges biasly separable to releasably receive the sheets.

The sheets 102, 104 may be made from a variety of materials such as plastic, vinyl, Lexan, Lucite, Acrylic, or any other similar material and may come in a variety of sizes, for example 8½×11 inches can be a typical size and 5½×8 inches can be for a mini version of the device. Additionally, the sheets 102, 104 may be color coded to efficiently organize the documents placed therein. The rigidity of the sheet material must be sufficient to create a requisite amount of biasing force between the sheets 102, 104 proximate to the binder mechanism 106 to hold a document therebetween. Simultaneously, the sheets must be flexible enough at their free ends to permit a user to easily insert and/or remove a document 107 without having to manipulate the sheets 102, 104 or the binder mechanism 106 in anyway.

Sufficient rigidity of the sheets 102, 104 may be achieved by using the above described sheet material or a substantially similar material having an average thickness in the range of 0.0075 inches to 0.020 inches. A sheet thickness of 0.010 inches may be adequate for sufficiently retaining most documents 107. However, it is contemplated that the thickness may be increased when large documents 107 or engineering drawings, for example, are to be displayed. Likewise, the device may be sized down such that an average sheet thickness of approximately 0.0050 inches could be adequate when there is only a need to support the display of very small documents 107 or notes. One skilled in the art, however, will recognize that the amount of retaining pressure needed is dependent on the type of sheet material used, the size (i.e., width and length) of the sheet material used, the thickness of the sheet material, and the force exerted by the binder mechanism 106. Likewise, the force caused by electrostatic energy is a function of the size of the sheets. The present invention anticipates that these parameters may be varied to achieve a custom display device for a specialized purpose other than those discussed herein.

Once the binder mechanism 106 has been attached to a structure, the sheets 102, 104 of the display device 100 may be slidably inserted therein. A user may then quickly and easily slide a document 107 between two adjacent sheets 102, 104 such that the region proximate to the binder mechanism 106 receives and captures at least one edge or corner of the document 107.

As further illustrated in FIG. 1, the display device 100 is capable of retaining multiple documents 107 or retaining just a single document. Mounting more than one display device 100 to a computer monitor 101, for example, can allow the user to readily display important messages, family photos, or other information while simultaneously displaying a working document.

FIGS. 2 through 8 illustrate another display device 200 according to another particular embodiment of the present invention. In the illustrated embodiment, the display device 200 has two folded sheets 202, 204 formed to create four sheet layers 203, 205, 207, and 209. Each sheet layer 203, 205, 207, 209 has a free end 208. The unequal distances between the respective free ends 208 of adjacent layers forms a tab-offset 214 between each pair.

The sheet layers 203, 205, 207, and 209, when nested together, have a common edge 210. The illustrated common edge 210 is releasably insertable into the binder mechanism 206. As stated above, the binder mechanism 206 can exert a compression force on the sheet layers, thereby creating a retention region 212 for releasably retaining the documents. The inclusion of more sheets and subsequent nesting thereof is fully contemplated by the applicant.

Figure 6:
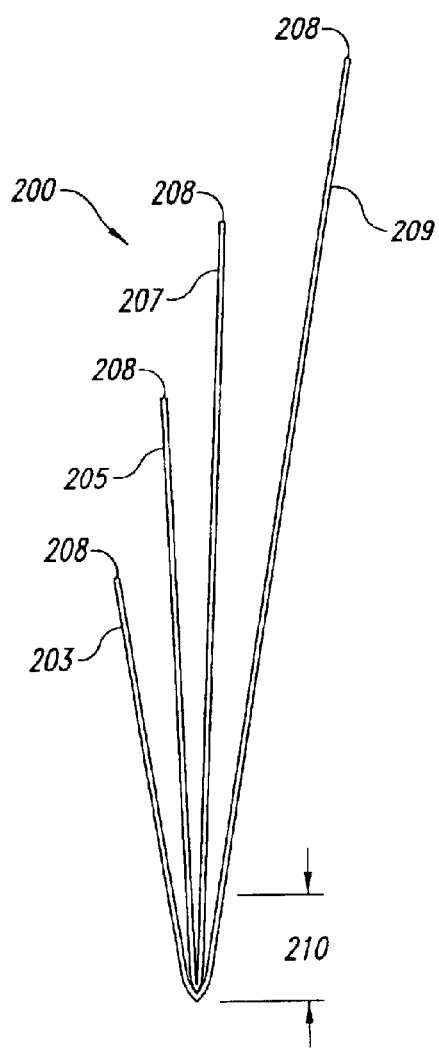
FIG. 6 is an end view of the sheets of FIG. 5.
Figure 8:
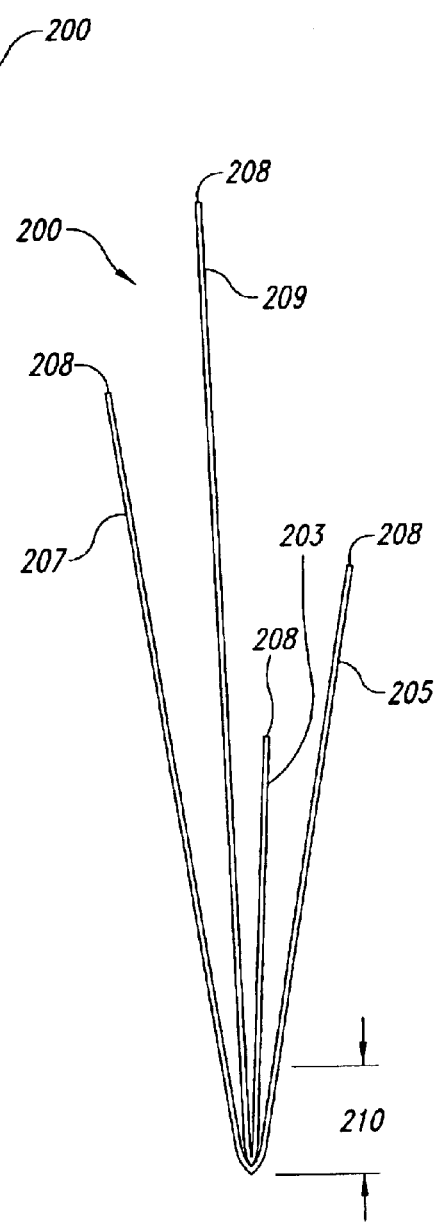
FIG. 8 is an end view of the sheets of FIG. 7.

The binder mechanism 206 may be removable from the sheets 202, 204 to permit the user to reconfigure the tab offsets 214, as illustrated by comparing FIGS. 6 and 8. The binder mechanism 206 may be integrally formed with a forward flange 216, an aft flange 218, and a backing 220 wherein the forward and aft flanges form the retention portion of the binding mechanism and are biasly separable to releasably receive the sheets 202, 204. The backing 220 may act as the mounting portion of the binder mechanism 206. The binder mechanism 206 may be made from a variety of materials such as plastic, wood, plastic reinforced composite material, ceramic, or glass, for example.

An advantage of the present embodiment is that the sheet layers may be differentially colored. The coloring, combined with the tab offset, permits a viewer to organize and easily locate documents placed between the adjacent sheet layers. Additionally, the free ends 208 may have rounded corners to provide an aesthetic appearance as well as ease the insertion of a document. The inventors appreciate that many of these details can be varied without deviating from the spirit of the invention; for example, the free ends 208 of the respective sheet layers 203, 205, 207, and 209 can be aligned with each other to eliminate the tab-offset 214. Further, more than two sheets may be nested together and the sheets may be different lengths and/or widths in the same set.

Figure 7:
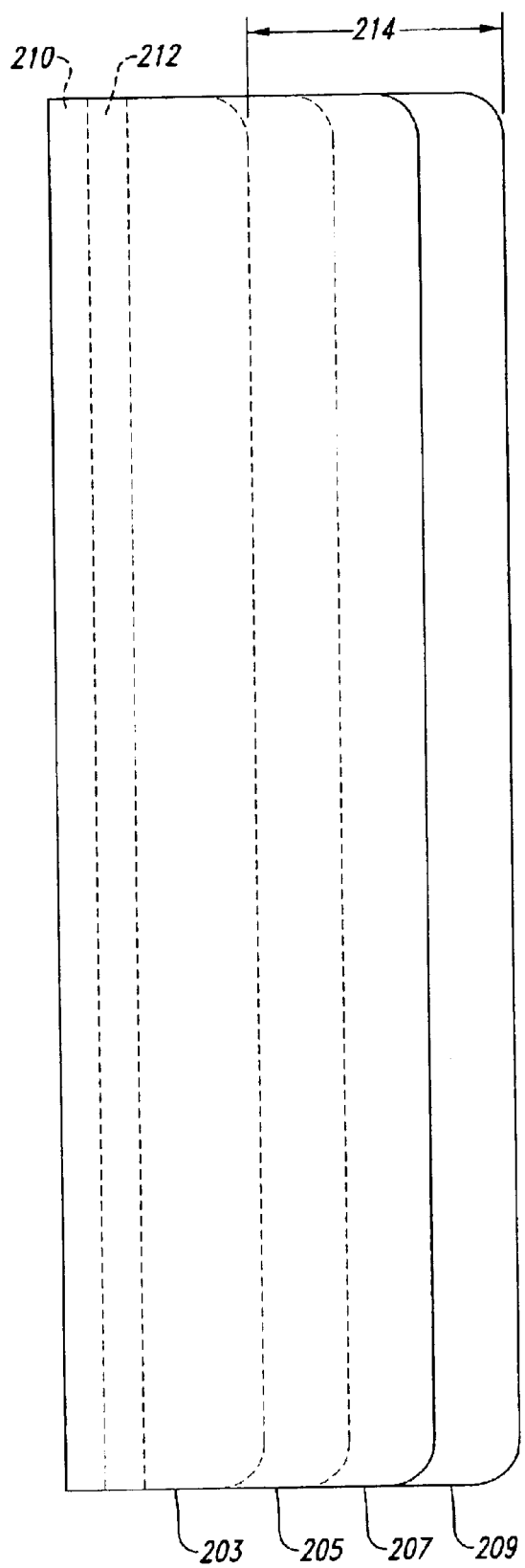
FIG. 7 is a plan view of the sheets of the present invention nested together in an alternate configuration.

FIGS. 5–8 illustrate two possible configurations of this particular embodiment of the present invention, wherein the nesting of the sheets 202 and 204 permits the tab offsets 214 to be reconfigured according to the user's desires. In the embodiment of FIGS. 7 and 8, a user could place a larger document between layers 207 and 209 and smaller documents between layers 209 and 203, and between layers 203 and 205. Such a configuration permits the user to maintain their small documents between layers 209 and 203, and between layers 203 and 205, while retaining a large "working" document between layers 207 and 209. The configuration illustrated in FIGS. 7 and 8 allows easy insertion and removal of the large "working" document, which is amply supported by layer 209, without disturbing the smaller documents located between the other layers.

Figure 9:
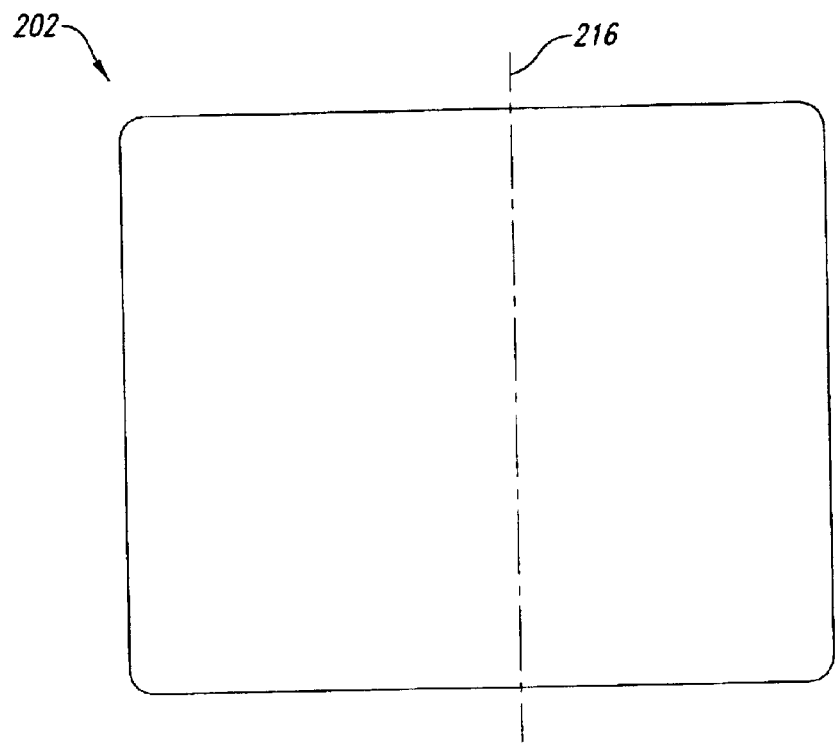
FIG. 9 is a plan view of one sheet from the device of FIG. 2, unfolded.
Figure 10:
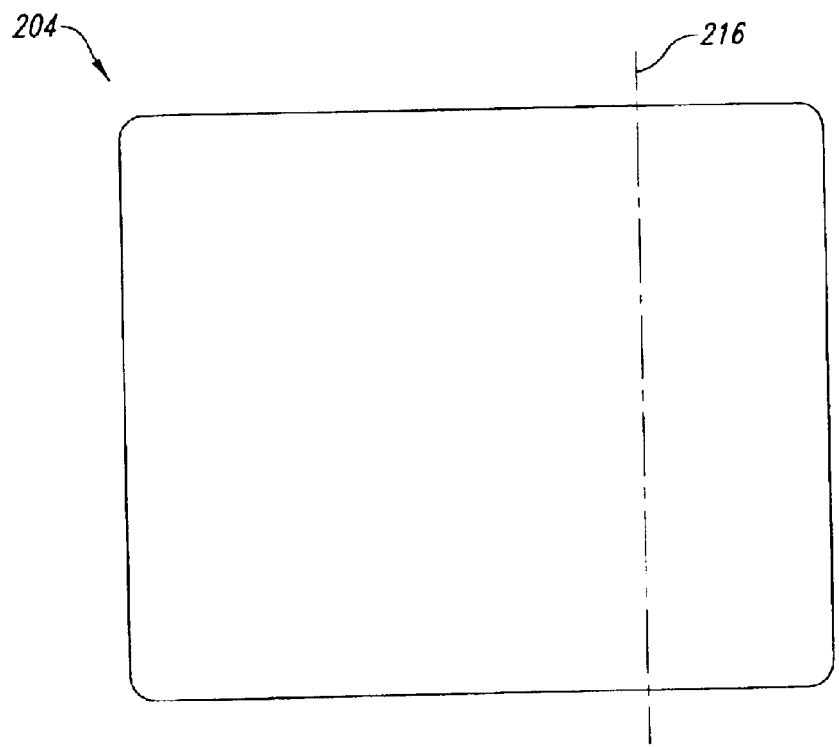
FIG. 10 is a plan view of another sheet from the device of FIG. 2, unfolded.

FIGS. 9 and 10 illustrate two examples of pre-formed sheets 202 and 204. The pre-formed sheets 202 and 204 schematically represented may be for a mini-version of the device. As discussed above, the sheets 202 and 204 may be folded along a predetermined crease line 216 to create two sheet layers. Alternatively, the sheets layers may be fabricated by splicing the sheets along the crease line 216 into separate layers. Perforating or scoring the sheets to ensure the accuracy of the folding splicing operation may create the crease line 216. One skilled in the art, however, will recognize that the sheets may vary in size and be creased either widthwise or lengthwise. It will further be appreciated that these options allow a large variety of configurations.

Figures 11, 12:
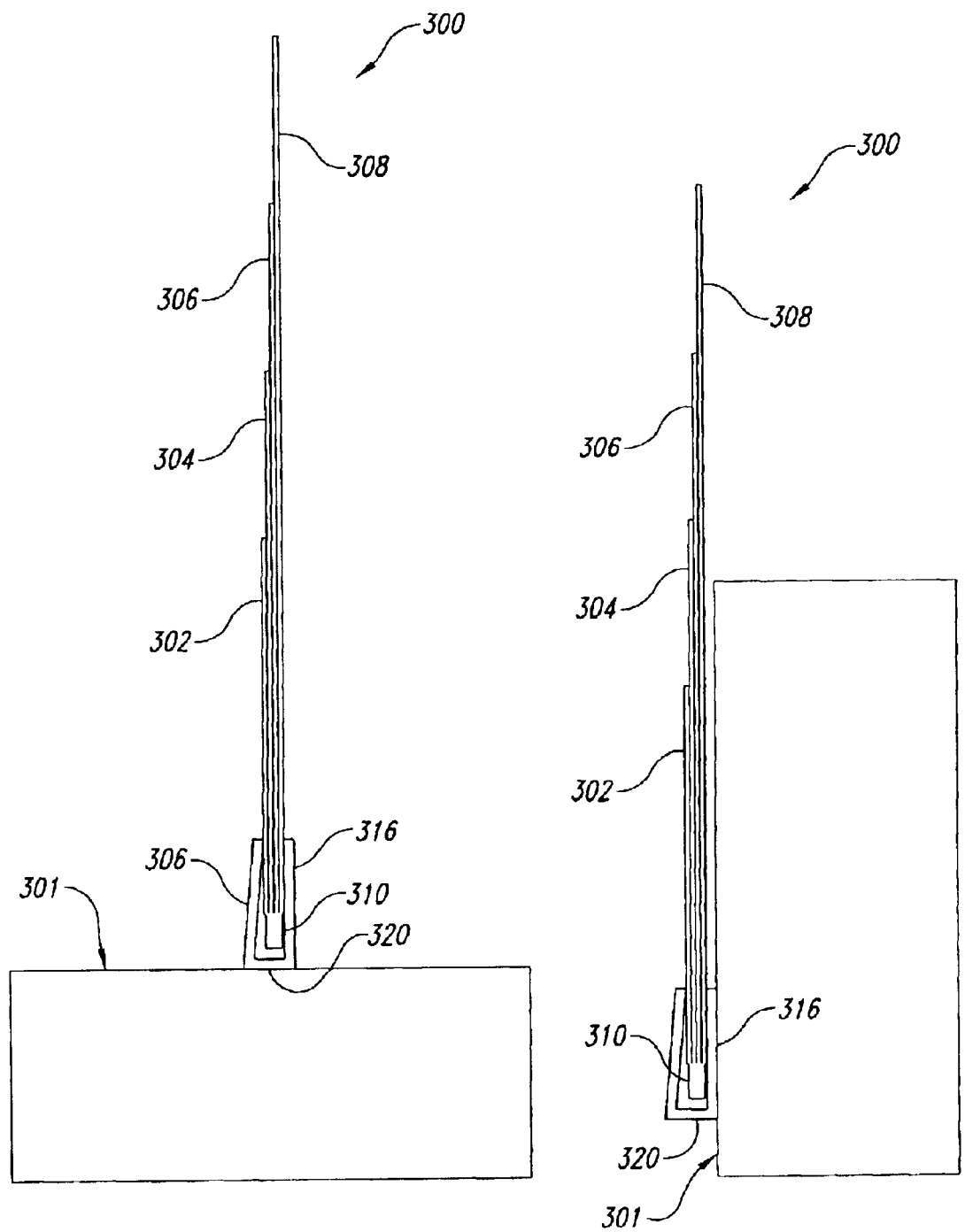
FIG. 11 is an end view of a display device according to another embodiment of the present invention.
FIG. 12 is an end view of the device of FIG. 11 in an alternate configuration.

FIGS. 11 and 12 illustrate another embodiment of a display device 300 releasably inserted into the binder mechanism 306. In this embodiment, the sheet layers 302, 304, 306, and 308 can be formed from separate sheets bonded together along the respective spliced edges 310. Thermally sealing ultrasonic welding, or mechanically affixing the spliced edges 310 together, for example, may accomplish the bonding operation. Bonding the spliced ends 310 together, in bulk, can provide a more efficient and economic mode of manufacturer.

FIGS. 11 and 12 further illustrate two various ways of mounting the device 300 with the binder mechanism 306. FIG. 11 demonstrates that the backing 320 of the binder mechanism 306 may be secured horizontally to surface 301. FIG. 12 demonstrates that one of the flanges 316 may be used to mount the device vertically to surface 301. Additionally, the mounting flange, for example the aft flange 316, may be oriented to project normally from the backing 320 to ensure that the sheets 302, 304, 306, and 308 are substantially parallel to the adjacent vertical surface 301 when mounted. As previously noted, the binder mechanism 306 may be secured to the surface 301 by a variety of means such as adhesive, foam tape, magnetic strip, or VELCRO®.

Figure 13:
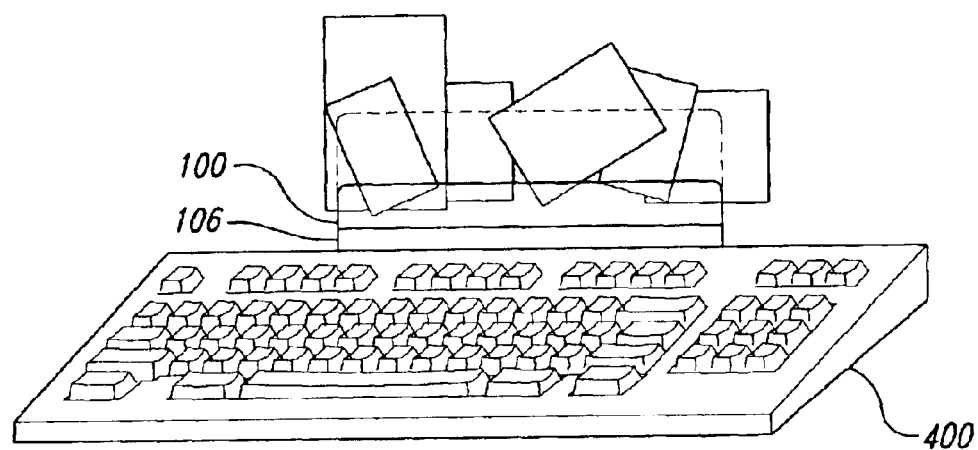
FIG. 13 is a computer keyboard with an embodiment of the present invention attached thereto.
Figure 14:
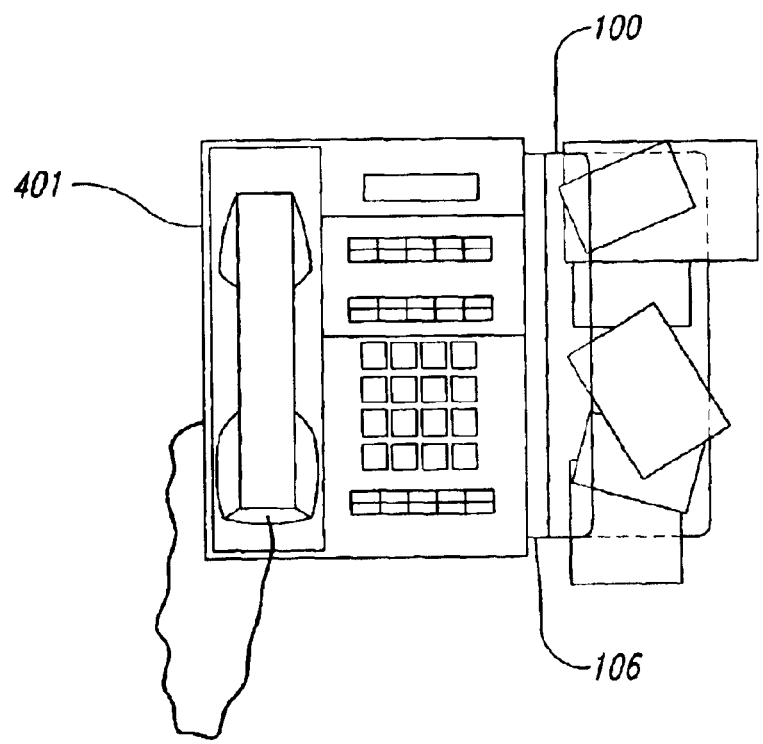
FIG. 14 is a wall mounted telephone with an embodiment of the present invention attached thereto.

FIGS. 13 and 14 illustrate alternate applications for the display device 100. For example, FIG. 13 demonstrates the device 100 horizontally attached to a top portion of a computer keyboard 400. The keyboard 400 may have a built-in channel (not shown) or a separate binder mechanism 106 may be used to attach the device to the keyboard. FIG. 14 demonstrates the device 100 as attached to a wall mounted telephone base 401 for home or home office use with the binder mechanism 106.

Figure 15:
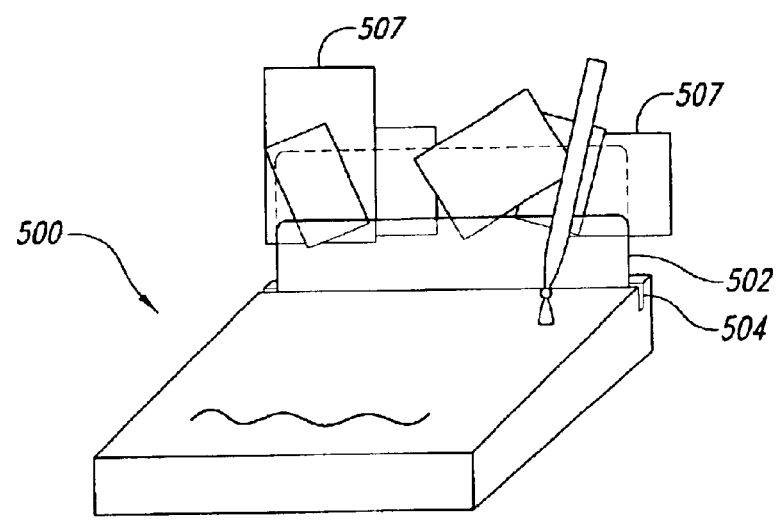
FIG. 15 is an isometric view of a display device according to yet another embodiment of the present invention.
Figure 16:
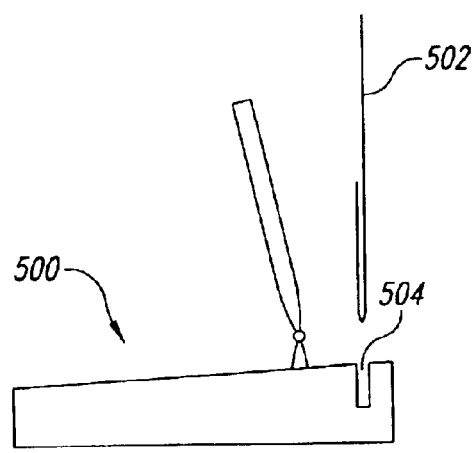
FIG. 16 is an exploded side view of the device of FIG. 15.

FIGS. 15 and 16 illustrate another embodiment of the present invention wherein the display device 500 incorporates a folded sheet 502 which can be slidably inserted into an object having a channel 504. As such, the channel 504 provides the binding and compression means in a substantially similar manner to the binder mechanism 106 discussed above. The width of the channel 504 may be adjusted using spacers; thus allowing the insertion of only one sheet or multiple sheets. Alternatively, the channel 504 may be formed to receive the binder mechanism 106 of FIGS. 11 and 12. As one skilled in the art will understand, the object 500 may be any number of home or office items such as a pen holder, a name plaque, or virtually anything with a channel 504 formed therein. Additionally, the object 500 may be mounted or placed in a horizontal, vertical, or other non-orthogonal orientation.

The present invention provides an inexpensive means of displaying a plurality of documents of various shapes and sizes and for organizing the same. A significant advantage of any of the foregoing embodiments is that the binder mechanism does not engage the documents. The device permits easy insertion and removal of the documents without damaging the documents in any manner. The device permits the insertion and removal of individual documents without disturbing the other documents. The device can be configured to place larger documents in full view of the user without disturbing smaller documents retained by the device. The sheet layers extending from the binder mechanism provide protection for the documents retained therein and provide an efficient method of sorting and organizing documents.

An additional advantage of the present invention is the ability to attach the device to any number of objects. Even with the binder mechanism attached to an object, the sheets may be slidably releasable to permit quick and easy reconfiguration.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for displaying a document in the vicinity of an object, the method comprising:

inserting at least two sheets having a common edge into a binder mechanism, the binder mechanism configured to supply a compressive force to the sheets to retain documents therebetween;

coupling the binder mechanism to the object; and placing a document between the sheets where an edge of the document is positioned proximate to, but not within, the binder mechanism.

2. The method of claim 1 wherein coupling the binder mechanism to the object includes bonding the binder mechanism to the object.

3. The method of claim 1 wherein the binder mechanism is attached to the object with Velcro®.

4. The method of claim 1 wherein coupling the binder mechanism to the object includes mechanically fastening the binder mechanism to the object.

5. The method of claim 1 wherein inserting at least two sheets having a common edge into the binder mechanism includes inserting the common edge into a channel formed in the object.

* * * * *